United States Patent [19]

Wilson

[11] Patent Number: 4,507,088

[45] Date of Patent: Mar. 26, 1985

[54] DECIPHERING APPARATUS

[76] Inventor: Norman Wilson, 58 Webb St., Stafford, Qld. 4053, Australia

[21] Appl. No.: 529,606

[22] Filed: Sep. 6, 1983

[30] Foreign Application Priority Data

Sep. 8, 1982 [AU] Australia ............................. PF5791

[51] Int. Cl.[3] ............................................. G09B 21/00
[52] U.S. Cl. ................................... 434/112; 400/122
[58] Field of Search ............... 434/112, 113, 114, 116; 400/122

[56] References Cited

PUBLICATIONS

IBM Technical Disclosure Bulletin, "Powered Braille Typing System", P. J. DeGeorge, vol. 12, No. 6, Nov. 1969.

*Primary Examiner*—William H. Grieb
*Attorney, Agent, or Firm*—Lackenbach Siegel Marzullo Presta & Aronson

[57] ABSTRACT

This invention relates to a deciphering apparatus comprising actuating means adapted to be associated with a coded keyboard for providing signals upon operation of the keyboard, and signal interpretation means associated with the actuating means and connectible to reproduction apparatus to cause the latter to provide a decipherable output therefrom responsive to the signals. The actuating means includes a plurality of mechanical links, having biased push rods mounted on a support housing having support means thereon for supporting a braille typing machine, whereby the push rods of the mechanical links co-operate with the respective keys of the keyboard of the braille typing machine for operation thereby.

7 Claims, 7 Drawing Figures

DECIPHERING APPARATUS

The invention relates to improvements to deciphering apparatus suitable for use by blind persons.

BACKGROUND OF THE INVENTION

Traditionally, blind persons communicate, other than orally, by the use of braille and for this purpose there has been developed a machine known as "Perkins Brailler" having nine keys which enables a blind person to quickly and effectively print braille. This machine and other similar machines have solved many communication problems. However braille print cannot be understood by most persons in the community and thus opportunities, particularly employment opportunities, for blind persons are severely limited.

Braille is a shorthand language with many contractions, and wordsigns designated by a single braille code and others designated by two codes. The word 'knowledge' is an example, this word is represented in braille by a 'space' followed by the letter 'K' with a following 'space'. As well as the many contractions and wordsigns there are seventy-nine abbreviations. Many of these abbreviations are extendable to other words. The abbreviation for 'ABOVE' (braille ABV) can be extended to 'ABOVEBOARD'. Printed braille is difficult to understand since braille codes are used for more than one purpose. The second dot set in a braille cell is an example. This can be the contraction 'EA'; the comma; the decimal point or the fraction denominator of one and there are of course many other similar cases.

While it is possible at present to provide printing apparatus which a blind person can utilize to provide conventional written English, the presently available apparatus such as typewriters and other electronic printing means have the disadvantage that a blind operator cannot readily check the work in progress. Thus if a blind person is interrupted during use of such a machine, that person may not be able to remember exactly what has already been printed. Additionally, many blind persons are familiar with the operation of the "Perkins Brailler" and indeed own such a machine and it is desirable that such persons be able to communicate by conventional printed language using existing skills associated and developed for the operation of a brailler printing machine.

SUMMARY OF THE INVENTION

The present invention in one aspect aims to provide a method of and means whereby a key operated brailler can provide a decipherable output preferably in association with type written braille. In a further aspect the present invention aims to provide apparatus which can be operated by skilled braille printing machine operators so as to provide an English text or the like. Other objects and advantages of the present invention will hereinafter become apparent from the following description.

With the foregoing and other objects in view, this invention in one aspect resides broadly in a method of coupling a braille keyboard to reproduction apparatus for providing decipherable non-braille output, the method including providing actuating means co-operable with said keyboard and adapted to provide distinguishable signals resulting from operation of the keyboard; supplying said signals to interpretation means and coupling said interpretation means to reproduction apparatus to provide a decipherable non-braille output. The interpretation means may be programmable in order to interpret inter alia, contractions and word signs and to provide an output in the appropriate language which will actuate a printing machine or the like to provide the decipherable output. The programmable interpretation means is preferably a micro processor including a random access memory and a programmable memory such as an Erasable Programmable Read Only Memory. Of course other types of computer apparatus could be used for this purpose.

Preferably the signal is an electrical signal but of course it could be an optical signal, a pneumatic, mechanical, or other signal as desired. The actuating means is preferably a mechanical/electrical interface and suitably this is associated with a touch type keyboard. Alternatively it may be provided by mounting electrical sensing means within a brailling machine.

In a preferred form there are provided separate mechanical actuating means which may be positioned in a selected co-operating relationship with a brailling machine so as to be actuated upon operation of the keyboard. The "Perkins Brailler" for example, which is in widespread use throughout the world has physical characteristics which have remained unchanged for many years. In one embodiment the mechanical interface is arranged to suit a "Perkins Brailler" and it includes nine upstanding plungers or reciprocal or pivotable mechanical relay members arranged on a support assembly for a "Perkins Brailler" and adapted to co-act with the various keys or associated levers of the keyboard on the Brailler. The arrangement is such that when the Brailler is operatively supported on the support assembly, operation of the braille keyboard provides corresponding actuation of the mechanical relay members. Any suitable method of interconnecting the mechanical relay members with switching apparatus may be used, such as the provision of micro-switches. However it is preferred that each mechanical relay member be operatively associated with an opto-interrupter to provide a suitable electrical signal upon operation of the keyboard.

In a conventional "Perkins Brailler" the arrangement of the keyboard is such that six "code" keys and associated levers are arranged at either side of a central "space" key or lever and upon actuation of each of the "code" keys the "space" key is also actuated. While this does not provide a space in the brailler type, it necessitates the use of monitoring means in the interpretation means which will provide a "space" signal to the printing apparatus only upon receipt of a "space and space only" signal from the keyboard. Additionally since in use there may be a finite time difference between actuation of keys which in use operate together to form a particular letter or symbol, the interpretation means must incorporate time delay means to ensure that pulses received within such finite but very small time span are treated as a single input to the interpretation means.

In a further aspect, this invention resides in deciphering apparatus including actuating means adapted to be associated with a coded keyboard for providing signals upon operation of said keyboard and signal interpretation means associated with said actuating means and connectible to reproduction apparatus to cause the latter to provide a decipherable output therefrom responsive to said signals. Preferably the coded keyboard is a braille keyboard although other types of coded keyboard may be used if desired.

The deciphering apparatus in one form includes a supporting housing for supporting braille typing apparatus and said actuating means including mechanical relay means co-operable with the keyboard on said braille typing apparatus to provide said signals. This invention also includes a braille keyboard coupled to said actuating means and adapted to provide a braille type output in conjunction with said non-braille output.

If desired the reproduction apparatus may include a speech synthesiser which may provide a spoken output either in the form of spoken words or it may provide a spoken letter in response to keyboard input. This would assist the blind operator during typing operations. Of course there may be provided control switches for selecting printed, spoken word or spoken letter outputs or combinations of these as desired.

BRIEF DESCRIPTION OF THE DRAWINGS

In order that the invention may be more readily understood and put into practical effect, reference will now be made to the accompanying drawings which illustrate a preferred embodiment of the invention, wherein.

DESCRIPTION OF THE PREFERRED EMBODIMENTS

Figure 1:
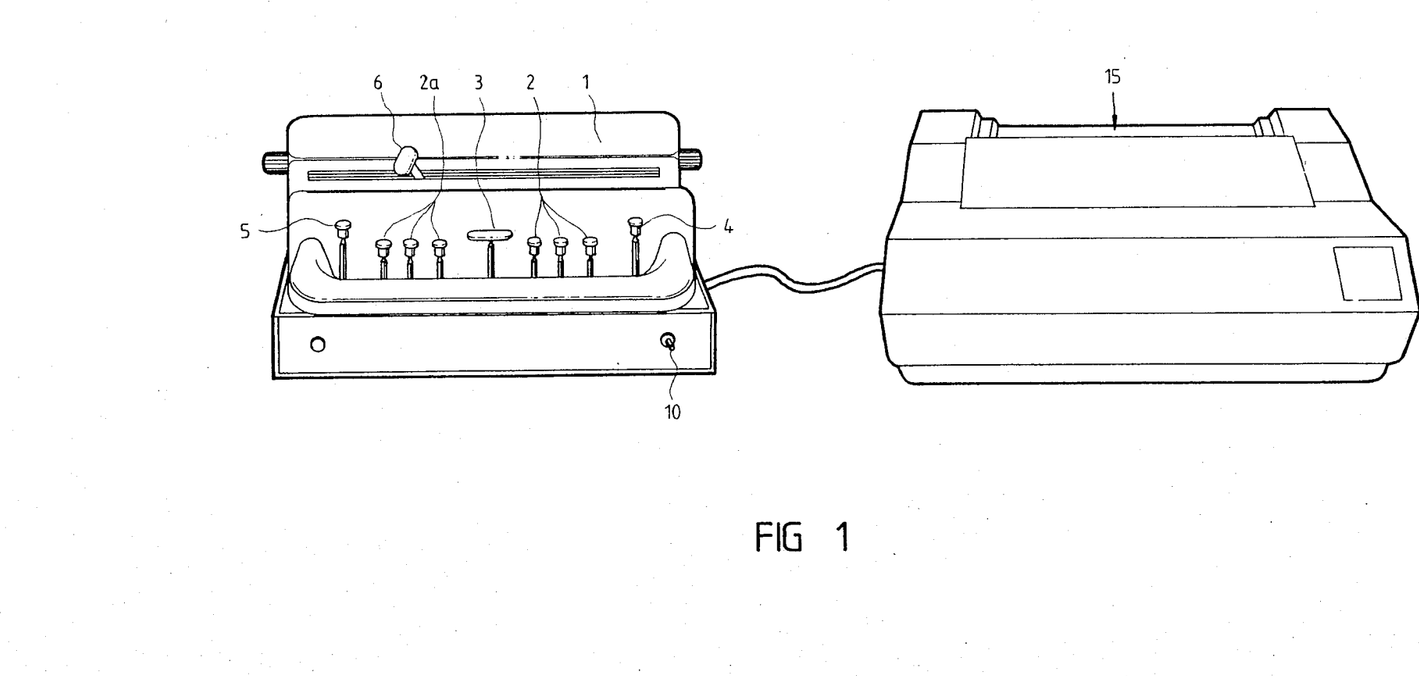
FIG. 1 is a perspective view of a "Perkins Brailler" associated with the apparatus of the present invention, adaptor, and an associated printer in accordance with the present invention.
Figure 2:
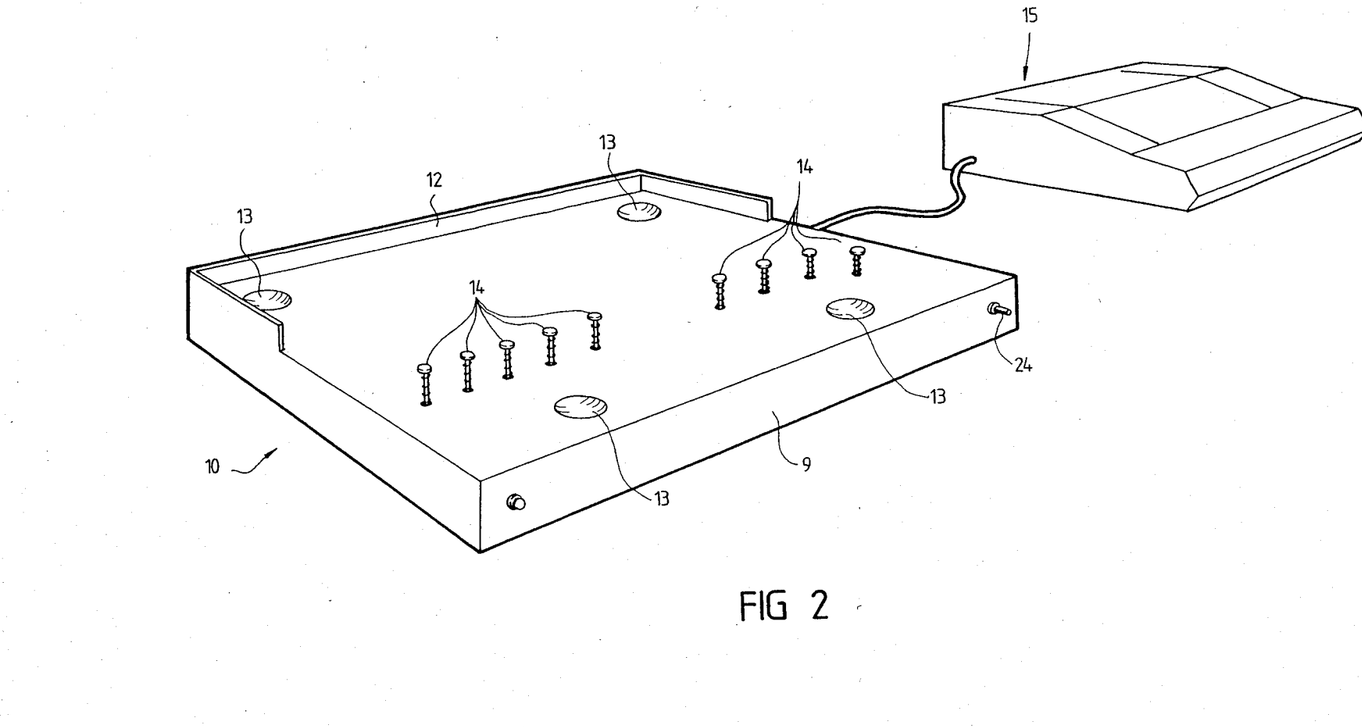
FIG. 2 is a perspective view showing the brailler removed.
Figure 3:
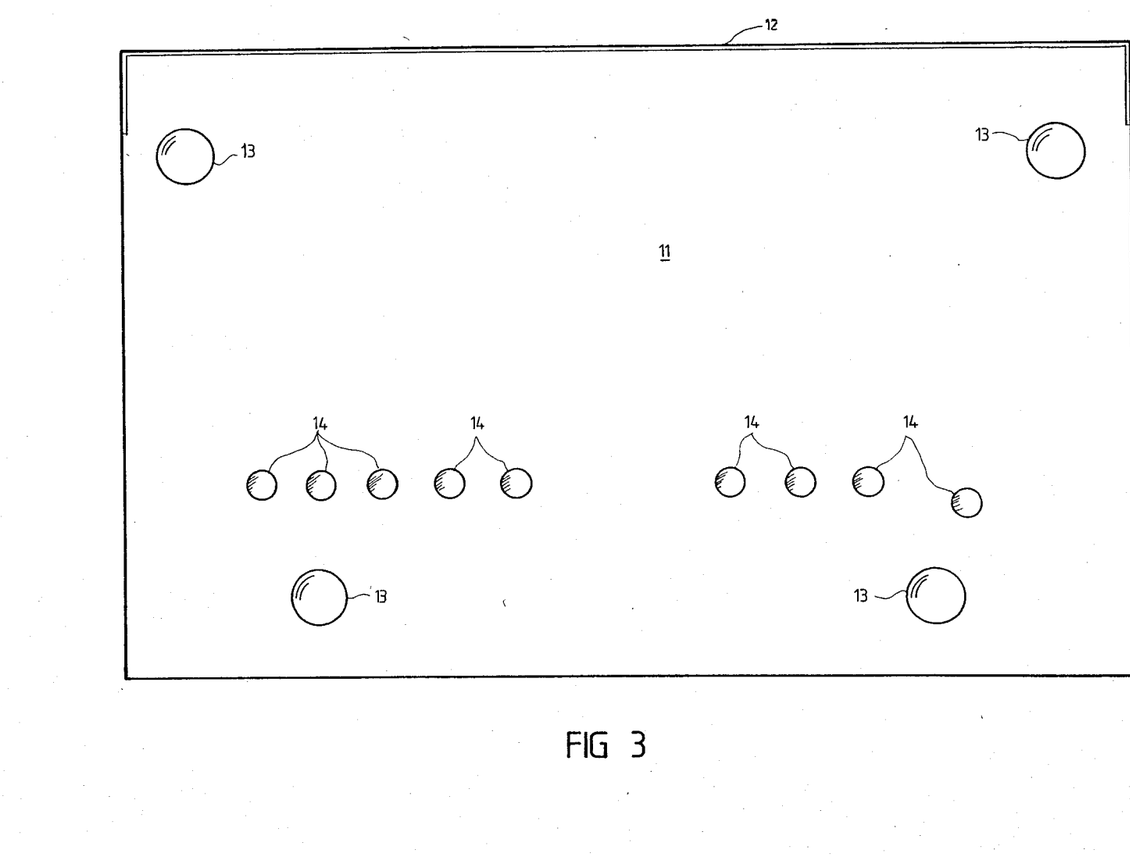
FIG. 3 is a plan view of the adaptor.

As shown, the Perkins Brailler 1 is supported on a supporting assembly 10 interconnected to a printer 15. The brailler 1 includes six dot code keys 2 and 2a spaced at opposite sides of the space key 3, a line feed key 4 and a back space key 5. A carriage return knob 6 is also provided. In the preferred embodiment of the invention the supporting assembly 10 has a substantially planar top face 11 provided with an upstanding U-shaped cradle part 12 around the back portion of the support surface 11 and indents 13 for receiving and locating the feet of the brailler. Nine push rods 14 extend upwardly through the supporting surface 11 and are arranged in a particular configuration whereby each co-operates either directly or indirectly with a respective key of the brailling apparatus. The six innermost push rods 14 co-operate directly with linkages connected to the dot code keys 2 and 2a while the outermost push rods 14 likewise co-operate with the line feed key and the back space key. The central space key co-operates with a side linkage with the remaining push rod 14 spaced lower than and forwardly of the adjacent push rods 14.

The supporting assembly 10 is preferably in the form of a slim housing 9 as shown such that it will not elevate the brailling machine 1 supported thereon to such extent that it will be difficult for the user to operate. The arrangement of the supporting surface 11 and the push rods or plungers 14 is such that a blind person may easily load the brailling machine 1 on to the supporting assembly 10 such as by locating the rear lower portion of the brailling apparatus 1 within the cradle 12 and subsequently lowering the front portion of the brailling apparatus 1 on to the supporting surface 11 such that the feet thereof engage in the respective depressions 13 and align the push rods 14 beneath the respective key linkages of the brailling apparatus 1 which are movable in response to actuation of the keys. The housing 9 supports the electrical interpretation means and associated circuitry and provides a conventional plug-in connection for a printer 15 which may be located adjacent the brailling operator or in any convenient location.

Figure 4:
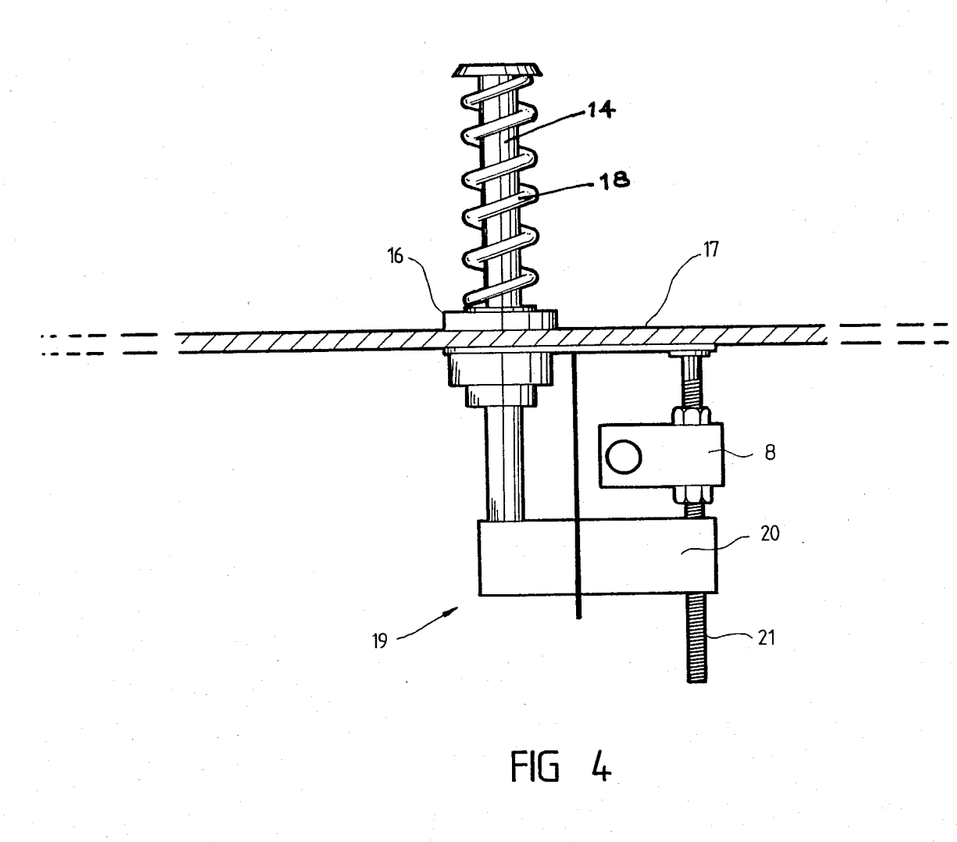
FIG. 4 is a side view of a preferred form of plunger type mechanical relay.

Each plunger 14 is supported by a bearing assembly 16 whereby it is guided for reciprocal movement through the top plate 17 of the housing 9 and each plunger 14 is spring urged upwardly by a lightweight coil spring 18 which applies in this instance an upwards biassing force of approximately 250 gms. The lower or inner end 19 of each plunger 14 supports a flag or shielding device 20 which normally extends across the mouth of an opto-interrupter 8 to interrupt the optical signal. When a plunger 14 is depressed, the flag 20 moves beyond the mouth and the opto-interrupter and the latter is actuated to provide an electrical signal, either singly or in combination with simultaneously operated keys.

The nine opto-interrupter units are series connected in sets of three and current limiting resistors are positioned on a terminal block in the housing 9. The outputs from the detector sections are taken to a data board via 'rainbow' cable. The opto units are positioned in conformity with the position of the plungers 14 and as mentioned, for convenient mechanical interfacing the opto unit associated with the "SPACE" kay is positioned between the plunger 14 for code key 3 and the plunger 14 for the "LINE SPACE" key.

The vertical position of the opto-interrupter units 8 is adjusted so that each becomes active at the start of the travel of each of the brailler keys, this adjustment is via movement of the opto units 8 on mounting screws 21, the adjustment being locked up by nuts on top and bottom of the opto units 8.

Figure 5:
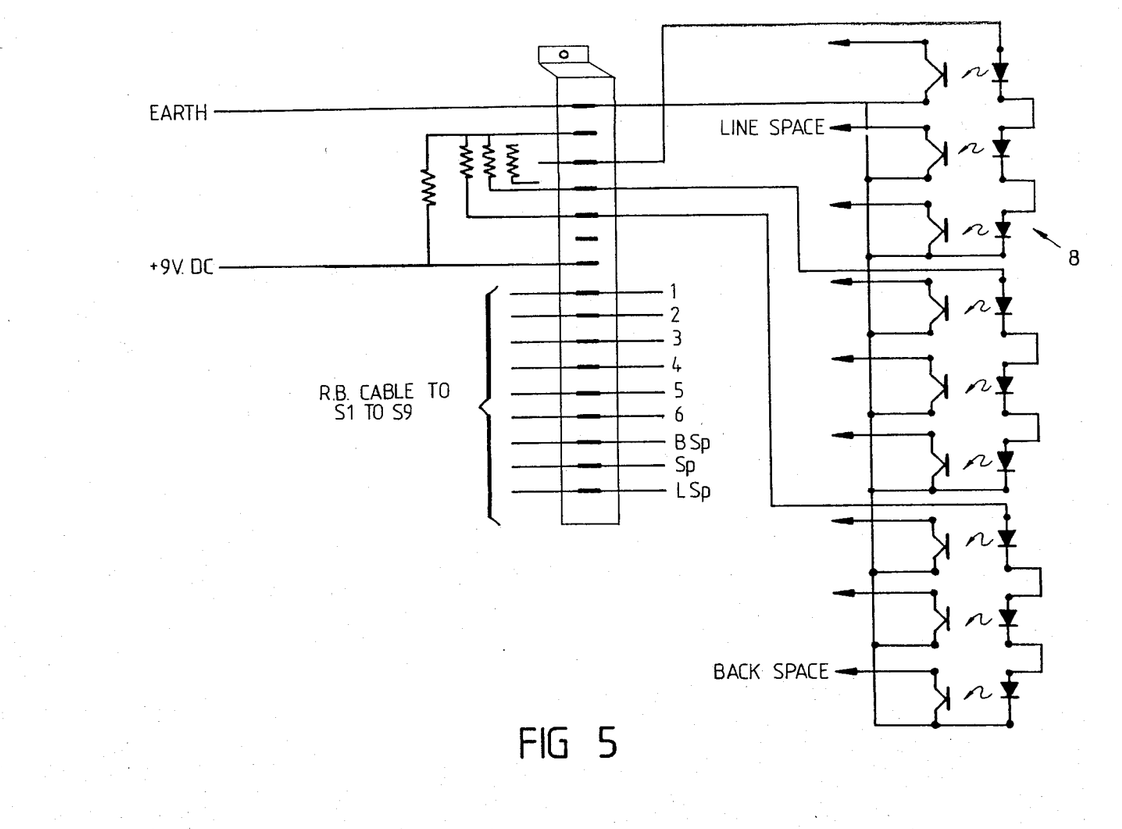
FIG. 5 is an electrical schematic illustrating the opto-interrupter terminations.
Figure 6:
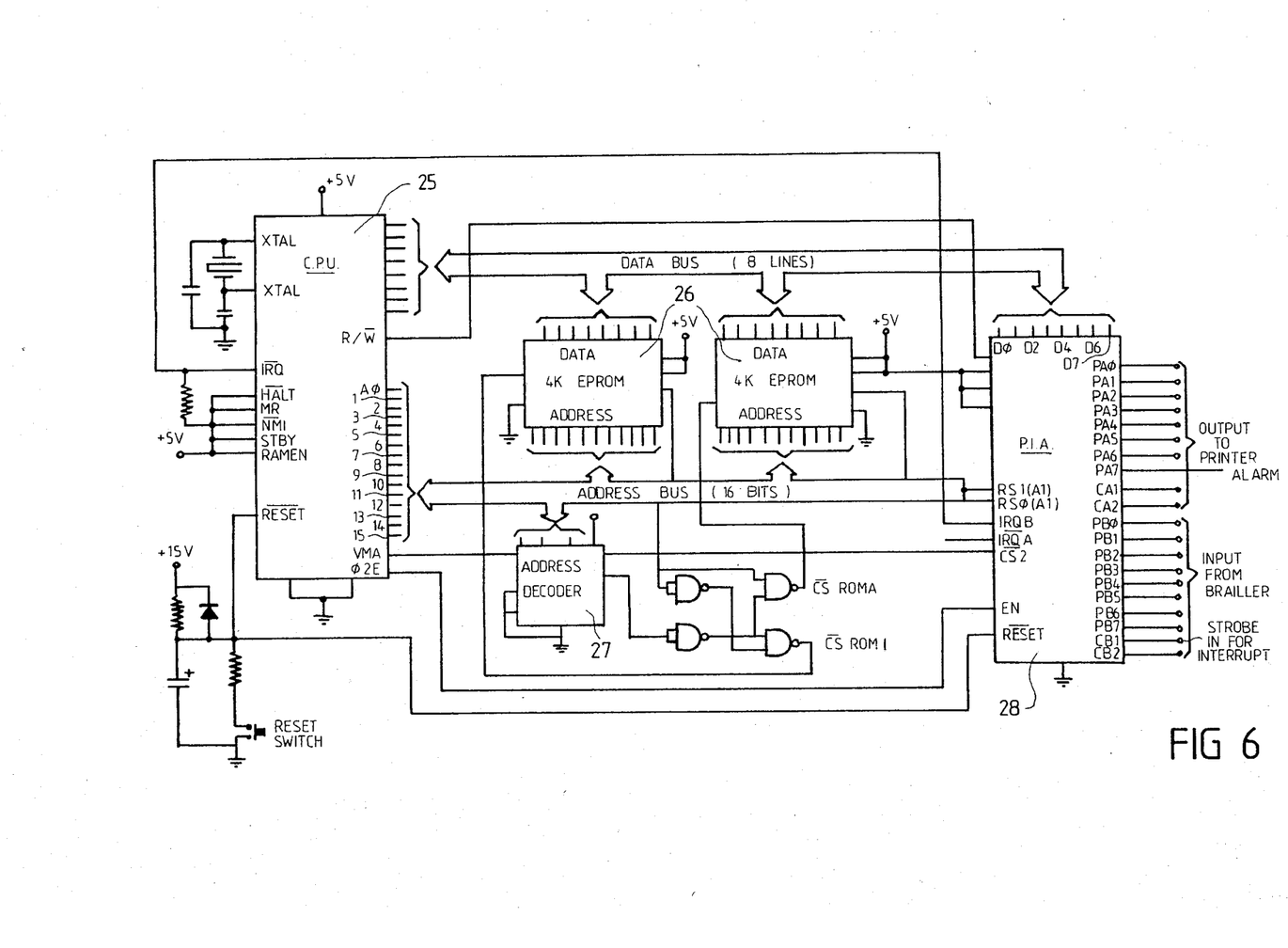
FIG. 6 is a schematic of the computer section.
Figure 7:
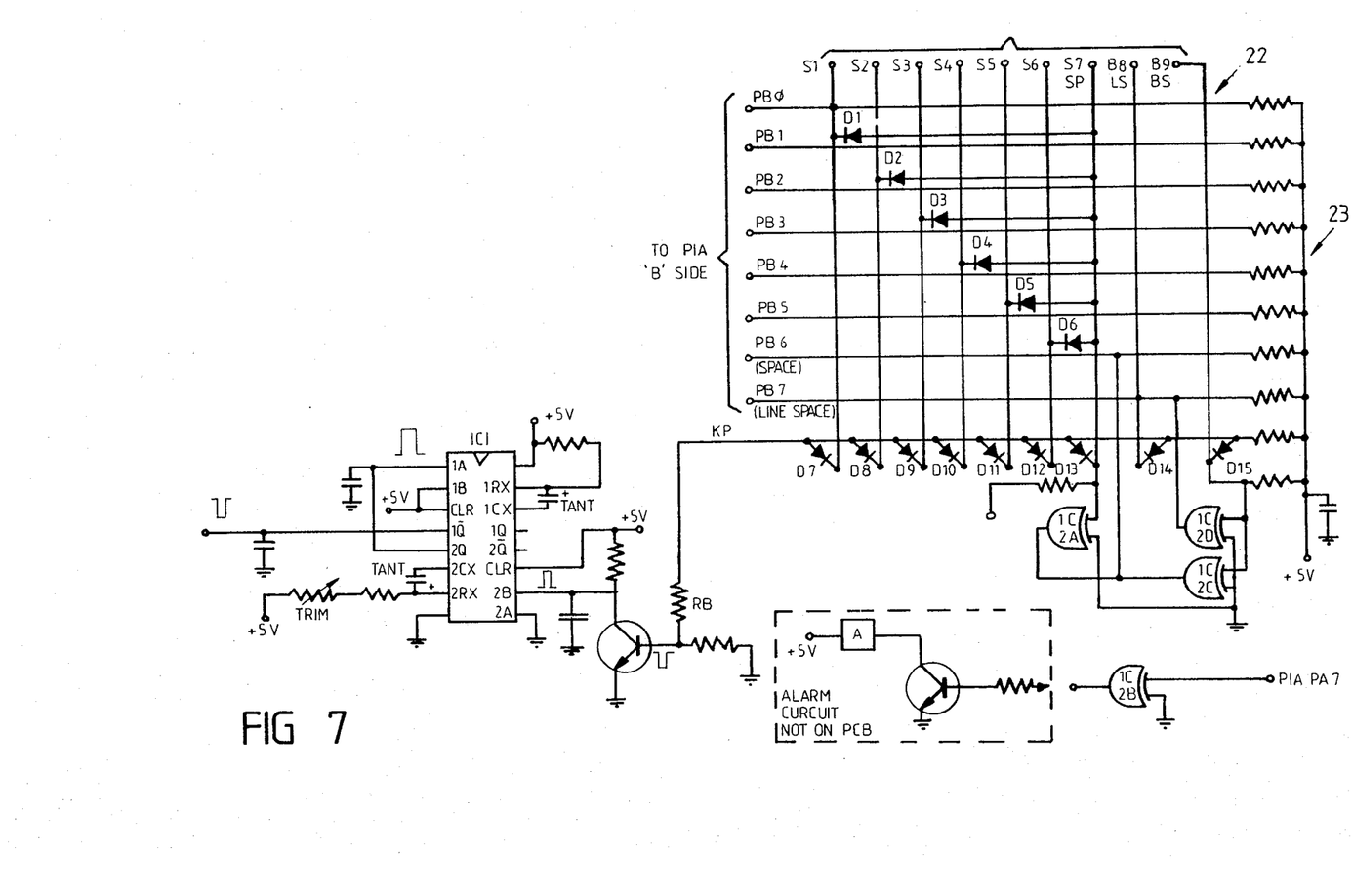
FIG. 7 illustrates interconnection between the opto-interrupters and the interpretation means.

The printer circuit board 22 which may be located adjacent to the printer cable outlet is illustrated in FIGS. 5 to 7. Data from the opto-interrupters 8 enters via points marked S1 to S9. Data lines 1 to 6 and LINE SPACE are linked through the board to output data lines PB0 to PB5 and PB7 (LINE SPACE), all these lines are pulled up to ±5 volts via resistors 23.

The SPACE and BACK SPACE lines from the opto-interrupters 8 associated with them are treated separately being processed through the integrated circuit IC2 before being connected to the output data lines PB6 (SPACE) and PB7 (LINE SPACE). By this means the BACK SPACE key on the brailler activates both PB6 and PB7.

Input lines S1 to S9 are connected to the KP (Keypressed) line via silicon diodes D7 to D15. The KP line is used to develop the interrupt for the computer section via the dual 'One Shot' integrated circuit IC1. A transistor is required between the KP line and the input of the second section of the integrated circuit IC1 to compensate for the voltage drop in diodes D7–D15. It is important that this transistor switches between logic 0 and logic 1 by the action of the KP line, the value of the resistance RB may need to be adjusted should this transistor be replaced at any time and the capacitor C1 shown on the circuit on the base of transistor T1 may not be required in all cases.

Data must be valid on all input lines before the interrupt strobe is sent to the computer section, thus a small delay must be developed to ensure that all keys for a particular character are active before the interrupt. The trim pot on pin 7 of the integrated circuit IC1 sets this delay, the speed at which this system may be operated will depend to some extent on the ability of the operator to activate multiple key operations simultaneously. The pulse width seen with a scope on the integrated circuit is the critical point, as the interrupt to the computer will be initiated on the NEGATIVE GOING edge of this pulse, thus the width of the pulse determines the delay between any brailler key being activated and the interrupt strobe being output. Examination of the interrupt pulse of the integrated circuit IC1 must show that only one pulse is generated by each action of the brailler key/keys.

As the brailler SPACE key is activated mechanically within the brailler by the action of any or all data keys 1 to 6, steps are taken in the software to correct the unwanted SPACE data, SPACE being valid only when SPACE AND SPACE ONLY is active. Diodes D1 to D6 simulate the action of the brailler SPACE with data to that the system may be tested without the brailler in position on the case simply by manual operation of the push-rods.

Integrated circuit IC2B is used to buffer the alarm signal from the computer section. This alarm will sound whenever the system is turned on, on operation of the 'Reset' button 24 or when any brailler kay has been released before the generation of the interrupt strobe has been completed.

The computer section as shown in FIG. 6 includes a central processing unit 25, 8K of EPROM memory 26 in two EPROM, address decoder 27 and a peripheral interface adaptor 28.

Data input from the brailler is to the 'B' side of the peripheral interface adaptor while the output to the line printer is from the A side. The first seven data lines carry the information to the printer, the eighth line being used to activate an alarm circuit.

Suitably the printer 15 is a standard dot matrix page printer. Preferably the printer includes an option whereby it may be commanded to print 'double width' characters. When the system is first turned on it initialises in the normal print mode, but may be commanded to 'double width' printing by sending two consecutive 'dot 6' from the Perkins Brailler, two consecutive 'dot 6' sent after that will command the printer back to normal print mode. This feature is useful for setting up headings on documents, for highlighting a particular word or phrase and when working with people with low vision.

In use an operator typing braille with a conventional "Perkins Brailler" operatively associated with printing apparatus by the present invention may at all times monitor the braille type in usual manner while actuation of the push rods 14 will cause the printer 15 to provide a printed language text corresponding to the printed braille.

Apart from one or two minor variations, the system will print in plain text such as English text by interpreting all the braille contractions, wordsigns, and abbreviations as well as punctuation signs, maths signs and numbers. Fractional numbers are included and print in the accepted text format such such as $325\frac{5}{8}$, 1/1000 etc., the percent sign prints in the accepted way, i.e. 28%, even though in braille the codes designating the percent sign precedes the number.

As well as being most useful to blind students who are being integrated into a normal education situation, this invention will be useful in work situation, such as that of a switchboard operator who could braille messages onto the printer, the copy being instantly available when required. If desired the push rods 14 may be directly manually operated to provide typing apparatus for blind persons which will accept an input in the braille code. The verbal reproduction of letters or numerals so typed will assist a blind operator in this instance. However it is preferred that the invention provide simultaneous braille and visually readable print so that a visually handicapped person may check on previously typed text.

The need for a time delay in the computer assembly as previously described when the keys are activated may be eliminated by appropriate modification to the operating programme. The latter can also be arranged to translate coded input other than the braille code, such as word abbreviation or shorthand codes.

Of course it will be realised that the above has been given by way of illustrated example only and all such modifications and variations as would be apparent to persons skilled in the art are deemed to fall within the broad scope and ambit of the present invention as described in the appended claims.

I claim:

1. Deciphering apparatus comprising actuating means adapted to be associated with a coded keyboard for providing signals upon operation of said keyboard, signal interpretation means associated with said actuating means and connectable to reproduction apparatus to cause said reproduction apparatus to provide a decipherable output therefrom responsive to said signal; said actuating means comprising a plurality of mechanical links mounted on a support housing having support means thereon for supporting a braille typing machine, and said mechanical links cooperating with the respective keys of said keyboard of said braille typing machine for operation thereby; and said mechanical links include a plurality of push rods biased to an extended position to engage operatively with the respective said keys.

2. Deciphering apparatus according to claim 1, wherein said coded keyboard is a braille keyboard.

3. Deciphering apparatus according to claim 1, wherein said decipherable output is English text.

4. Deciphering apparatus according to claim 1, wherein there are provided nine upstanding push rods arranged to co-operate with the respective keys of a "Perkins Brailler".

5. Deciphering apparatus according to claim 1, wherein each said push rod is connected to an opto-interrupter switch to provide an electrical signal upon actuation of said keyboard.

6. Deciphering apparatus according to claim 1, wherein said interpretation means includes a computer assembly programmed to receive and translate electrical input signals from said actuating means and to provide an output connectible to printing apparatus to cause the latter to reproduce a printed output corresponding to the information input to said keyboard.

7. Deciphering apparatus according to claim 6, wherein said interpretation means includes time delay means to ensure receipt of operatively simultaneously sent pulses to be constituted as a single input signal.

* * * * *